United States Patent
Hayakawa et al.

(10) Patent No.: US 11,303,200 B2
(45) Date of Patent: Apr. 12, 2022

(54) POWER SUPPLY DEVICE AND OVERCURRENT PROTECTIVE DEVICE

(71) Applicant: Panasonic Intellectual Property Management Co., Ltd., Osaka (JP)

(72) Inventors: Takahiro Hayakawa, Kanagawa Ken (JP); Satoshi Azuhata, Tokyo To (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/911,033

(22) Filed: Jun. 24, 2020

(65) Prior Publication Data

US 2020/0412234 A1 Dec. 31, 2020

(30) Foreign Application Priority Data

Jun. 28, 2019 (JP) .............................. JP2019-122392

(51) Int. Cl.
*H02M 1/32* (2007.01)
*H02M 3/156* (2006.01)

(52) U.S. Cl.
CPC ............. *H02M 1/32* (2013.01); *H02M 3/156* (2013.01)

(58) Field of Classification Search
CPC ................................ H02M 3/156; H02M 1/32
See application file for complete search history.

(56) References Cited

U.S. PATENT DOCUMENTS

| | | | |
|---|---|---|---|
| 7,038,436 B2 | 5/2006 | Goto et al. | |
| 2017/0023905 A1* | 1/2017 | Tsuchiya | G03G 15/80 |
| 2019/0199219 A1* | 6/2019 | Ida | H02M 3/1588 |
| 2019/0238054 A1* | 8/2019 | Flaibani | H02M 3/156 |
| 2021/0100082 A1* | 4/2021 | Aoki | H05B 45/375 |

FOREIGN PATENT DOCUMENTS

| | | |
|---|---|---|
| JP | 2005-020833 | 1/2005 |
| JP | 4805197 | 10/2008 |
| JP | 2012-198624 | 10/2012 |

* cited by examiner

*Primary Examiner* — Rafael O De Leon Domenech
(74) *Attorney, Agent, or Firm* — Greenblum & Bernstein, P.L.C.

(57) ABSTRACT

A power supply device according to the present disclosure includes a first resistor and a second resistor connected in series between an output terminal and a reference potential; a power converter connected to the output terminal and a reference point between the first resistor and the second resistor, configured to supply a first voltage to the output terminal, and configured to control the first voltage to cause a second voltage generated at the reference point, to have a predetermined value; a protective current output circuit configured to output a protective current depending on an output current supplied to the output terminal and a limit current; and a control circuit to which the protective current is input, the control circuit being configured to draw in, from the reference point, a drawn-in current obtained by subtracting the protective current from a set current depending on a set value.

10 Claims, 9 Drawing Sheets

POWER SUPPLY DEVICE AND OVERCURRENT PROTECTIVE DEVICE

CROSS-REFERENCE TO RELATED APPLICATIONS

This application is based upon and claims the benefit of priority from Japanese Patent Application No. 2019-122392, filed on Jun. 28, 2019, the entire contents of which are incorporated herein by reference.

FIELD

The present disclosure relates to a power supply device and an overcurrent protective device.

BACKGROUND

There is known a power supply device using a DC-DC converter. Typically, the DC-DC converter controls a voltage to be output so that a feedback voltage that is obtained by dividing an output voltage by a resistor becomes constant.

There is also known a power supply device that can change an output voltage of the DC-DC converter by an externally provided control circuit. For example, the control circuit changes the output voltage of the DC-DC converter by drawing in a certain amount of current flowing in a resistor for detecting a feedback voltage. Conventional techniques are described in Japanese Patent Application Laid-open No. 2012-198624 and Japanese Patent No. 4805197, for example.

However, the power supply device including such a control circuit may output an output voltage higher than a voltage that is assumed in a case of using the DC-DC converter alone by controlling a current drawn in by the control circuit. Thus, with the power supply device including such a control circuit, it may be difficult to provide protection against an overcurrent by using an overcurrent protective function incorporated in the DC-DC converter.

Due to this, in the power supply device including such a control circuit, it is conceivable to provide a microcontroller outside the DC-DC converter. For example, in a case in which an overcurrent is detected, it is possible to protect the power supply device from the overcurrent by stopping supply of electric power supplied to the DC-DC converter by the microcontroller. However, it may take some time from when the overcurrent is generated until supply of electric power is stopped by the microcontroller. In such a case, it is difficult to rapidly protect the power supply device from the overcurrent.

The present disclosure provides a power supply device and an overcurrent protective device that can provide protection against an overcurrent rapidly.

SUMMARY

A power supply device according to the present disclosure includes an output terminal, a first resistor, a second resistor, a power converter, a protective current output circuit, and a control circuit. The first resistor and the second resistor are connected in series between the output terminal and a reference potential. The power converter is connected to the output terminal and a reference point between the first resistor and the second resistor, configured to supply a first voltage to the output terminal, and configured to control the first voltage to cause a second voltage generated at the reference point, to have a predetermined value. The protective current output circuit is configured to output a protective current depending on an output current supplied to the output terminal and a limit current serving as a threshold. The control circuit to which the protective current is input, the control circuit is configured to draw in, from the reference point, a drawn-in current obtained by subtracting the protective current from a set current depending on a set value.

DETAILED DESCRIPTION

The following describes an embodiment of a power supply device 10 according to the present disclosure with reference to the accompanying drawings.

Figure 1:
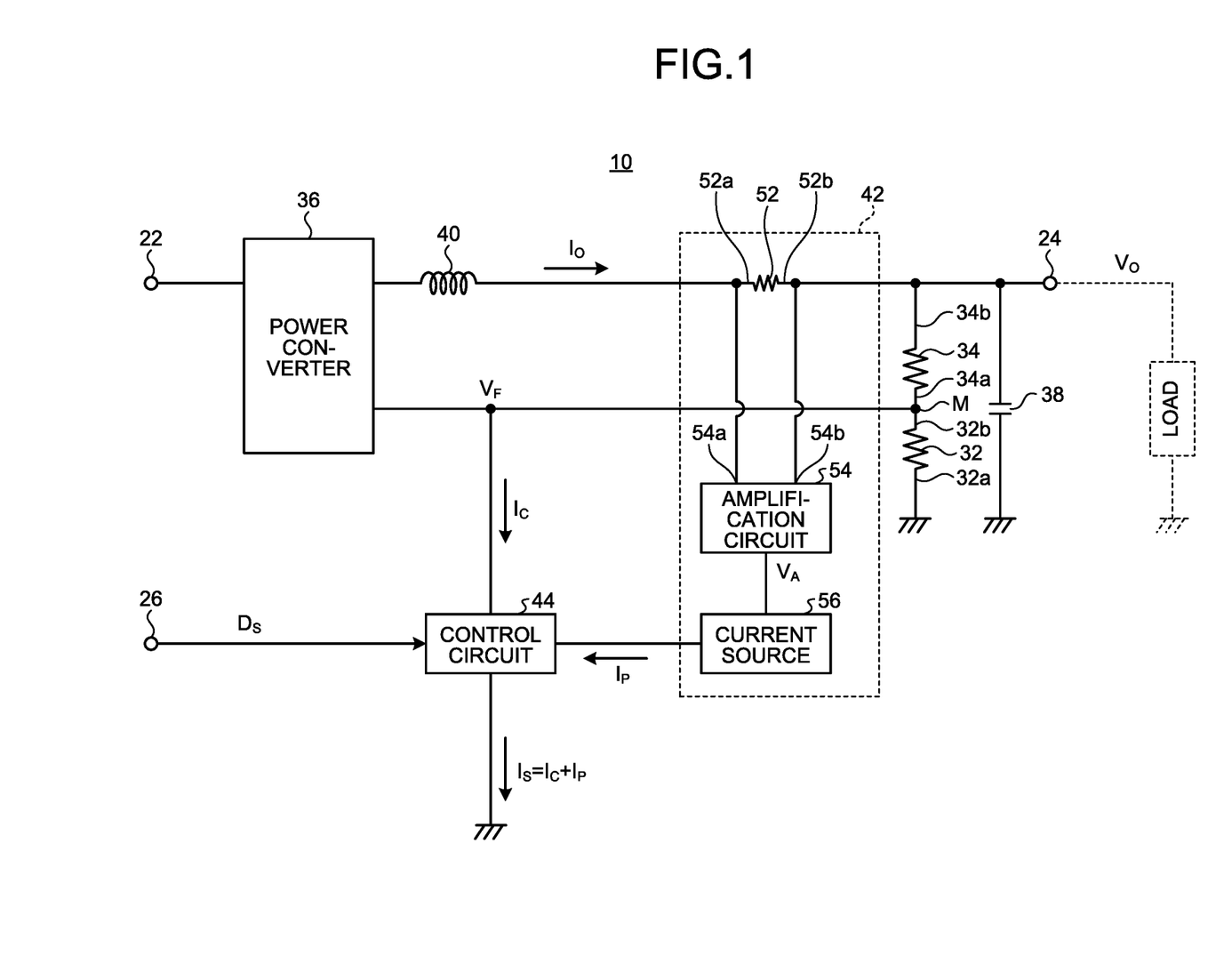
FIG. 1 is a diagram illustrating a configuration of a power supply device according to an embodiment.

FIG. 1 is a diagram illustrating a configuration of the power supply device 10 according to the embodiment. The power supply device 10 includes an input terminal 22, a voltage output terminal 24, and a setting terminal 26. The voltage output terminal 24 is an example of an output terminal. The power supply device 10 receives electric power from the input terminal 22, and outputs a stabilized direct-current output voltage $V_O$ from the voltage output terminal 24. The output voltage $V_O$ is an example of a first voltage. The power supply device 10 supplies the direct-current output voltage $V_O$ to a load from the voltage output terminal 24. The load may be any device, for example, an integrated circuit such as a power semiconductor, a motor, or an oscillator.

The power supply device 10 receives a set value $D_S$ from the setting terminal 26. The power supply device 10 changes the output voltage $V_O$ in accordance with the received set value $D_S$. Furthermore, in a case in which an overcurrent exceeding a predetermined limit current $I_{LIM}$ flows into the load, the power supply device 10 lowers the output voltage $V_O$ to reduce the overcurrent.

The power supply device 10 includes a first resistor 32, a second resistor 34, a power converter 36, a capacitor 38, an inductor 40, an overcurrent detection circuit 42, and a control circuit 44. The overcurrent detection circuit 42 according to the embodiment is an example of a protective current output circuit.

The power converter 36 is connected to the input terminal 22. The power converter 36 is connected to the second resistor 34 and the voltage output terminal 24 via the inductor 40 and the overcurrent detection circuit 42.

The power converter 36 receives the voltage from the input terminal 22, and outputs the stabilized direct-current output voltage $V_O$. The power converter 36 then supplies the output voltage $V_O$ to the voltage output terminal 24. In the present embodiment, the power converter 36 is a DC-DC converter that receives a direct-current voltage and outputs the direct-current voltage. The power converter 36 may be an AC-DC converter that receives an alternating-current voltage and outputs a direct-current voltage. The power converter 36 may also be a series regulator that receives a direct-current voltage and outputs a direct-current voltage.

The inductor 40 is connected in series between the power converter 36 and the voltage output terminal 24. The inductor 40 levels the voltage supplied from the power converter 36 to the load, for example. The inductor 40 also absorbs a noise such as a current ripple included in an output current $I_O$ flowing from the power converter 36 to the load. The power supply device 10 may have a configuration including a plurality of the inductors 40.

The capacitor 38 is connected between the voltage output terminal 24 and a reference potential. The capacitor 38 levels a voltage supplied from the voltage output terminal 24 to the load, for example. The capacitor 38 also absorbs noise such as a voltage ripple included in the output voltage $V_O$, for example.

The first resistor 32 and the second resistor 34 are connected in series between the voltage output terminal 24 and the reference potential. The reference potential is, for example, a ground. The first resistor 32 includes a first terminal 32a and a second terminal 32b, and the first terminal 32a is connected to the reference potential. The second resistor 34 includes a first terminal 34a and a second terminal 34b, the first terminal 34a is connected to the second terminal 32b of the first resistor 32, and the second terminal 34b is connected to the voltage output terminal 24.

The first resistor 32 and the second resistor 34 are set to have a predetermined resistance ratio. The first resistor 32 and the second resistor 34 each have a resistance value that is sufficiently higher than that of the load. Due to this, it is possible to reduce influence of the first resistor 32 and the second resistor 34 on electric power supplied to the load. A connection point between the first resistor 32 and the second resistor 34 is assumed to be a reference point M. The reference point M is connected to the power converter 36.

The power converter 36 also receives a feedback voltage $V_F$ generated at the reference point M. The feedback voltage $V_F$ is an example of a second voltage. The power converter 36 then controls the output voltage $V_O$ so that the feedback voltage $V_F$ becomes a predetermined value. For example, in a case in which the feedback voltage $V_F$ is smaller than the predetermined value, the power converter 36 causes the output voltage $V_O$ to be high. For example, in a case in which the feedback voltage $V_F$ is larger than the predetermined value, the power converter 36 causes the output voltage $V_O$ to be low.

The overcurrent detection circuit 42 outputs a protective current $I_P$ depending on the output current $I_O$ supplied from the power converter 36 to the voltage output terminal 24 and the limit current $I_{LIM}$ as a threshold. In the present embodiment, the overcurrent detection circuit 42 generates the protective current $I_P$ in a case in which the output current $I_O$ supplied from the power converter 36 to the voltage output terminal 24 is larger than the limit current $I_{LIM}$ as the threshold. The protective current $I_P$ is proportional to the overcurrent obtained by subtracting the limit current $I_{LIM}$ from the output current $I_O$. In a case in which the output current $I_O$ is equal to or smaller than the limit current $I_{LIM}$, the overcurrent detection circuit 42 does not generate the protective current $I_P$. That is, in a case in which the output current $I_O$ is equal to or smaller than the limit current $I_{LIM}$, the overcurrent detection circuit 42 causes the protective current $I_P$ to be 0. The overcurrent detection circuit 42 supplies the generated protective current $I_P$ to the control circuit 44. The overcurrent detection circuit 42 outputs the protective current $I_P$ having a fixed value irrespective of impedance of the control circuit 44.

The control circuit 44 receives the set value $D_S$ that is previously input by a user and the like from the setting terminal 26. The control circuit 44 receives the protective current $I_P$ from the overcurrent detection circuit 42. The control circuit 44 also draws in a drawn-in current $I_C$ from the reference point M. The control circuit 44 then causes a current obtained by adding the drawn-in current $I_C$ to the protective current $I_P$ to flow to the reference potential. The control circuit 44 operates so as to cause the current obtained by adding the protective current $I_P$ to the drawn-in current $I_C$ to be identical to a set current $I_S$ depending on the set value $D_S$. That is, the control circuit 44 operates so as to draw in, from the reference point M, the drawn-in current $I_C$ having a current value obtained by subtracting the protective current $I_P$ from the set current $I_S$.

In the present embodiment, the overcurrent detection circuit 42 includes a detection resistor 52, an amplification circuit 54, and a current source 56.

The detection resistor 52 includes a first terminal 52a and a second terminal 52b, and connected in series between the power converter 36 and the voltage output terminal 24. In the present embodiment, the first terminal 52a of the detection resistor 52 is connected to the power converter 36 via the inductor 40. The second terminal 52b of the detection resistor 52 is connected to the voltage output terminal 24.

The amplification circuit 54 includes a first terminal 54a and a second terminal 54b. The first terminal 54a of the amplification circuit 54 is connected to the first terminal 52a of the detection resistor 52. The second terminal 54b of the amplification circuit 54 is connected to the second terminal 52b of the detection resistor 52. The amplification circuit 54 detects a voltage generated in the detection resistor 52. The voltage generated in the detection resistor 52 is a voltage between the first terminal 52a of the detection resistor 52 and the second terminal 52b of the detection resistor 52. The amplification circuit 54 then generates a detection voltage $V_A$ obtained by amplifying the voltage generated in the detection resistor 52 by a predetermined amplification factor. The amplification circuit 54 supplies the detection voltage $V_A$ to the current source 56.

The current source 56 receives, for example, a limit voltage $V_{LIM}$ from a reference power supply and the like on the outside. The current source 56 may generate the limit voltage $V_{LIM}$ having magnitude depending on the limit current $I_{LIM}$. In a case in which the detection voltage $V_A$ is larger than the limit voltage $V_{LIM}$, the current source 56 outputs the protective current $I_P$ having magnitude depending on a difference voltage that is a voltage obtained by subtracting the limit voltage $V_{LIM}$ from the detection voltage $V_A$. For example, the current source 56 outputs the protective current $I_P$ proportional to the difference voltage. In a case in which the detection voltage $V_A$ is equal to or smaller than the limit voltage $V_{LIM}$, the current source 56 does not output the protective current $I_P$. That is, in a case in which the detection voltage $V_A$ is equal to or smaller than the limit voltage $V_{LIM}$, the current source 56 causes the protective current $I_P$ to be 0.

The current source 56 supplies the protective current $I_P$ to the control circuit 44. The current source 56 outputs the protective current $I_P$ having a fixed value irrespective of impedance of the control circuit 44.

In the present embodiment, the detection resistor 52 of the overcurrent detection circuit 42 has a configuration being connected between the inductor 40 and the second terminal 34b of the second resistor 34, but may be connected between the second terminal 34b of the second resistor 34 and the voltage output terminal 24. That is, the first resistor 32 and the second resistor 34 may be connected in series between the reference potential and wiring closer to the power converter 36 than the overcurrent detection circuit 42.

Figure 2:
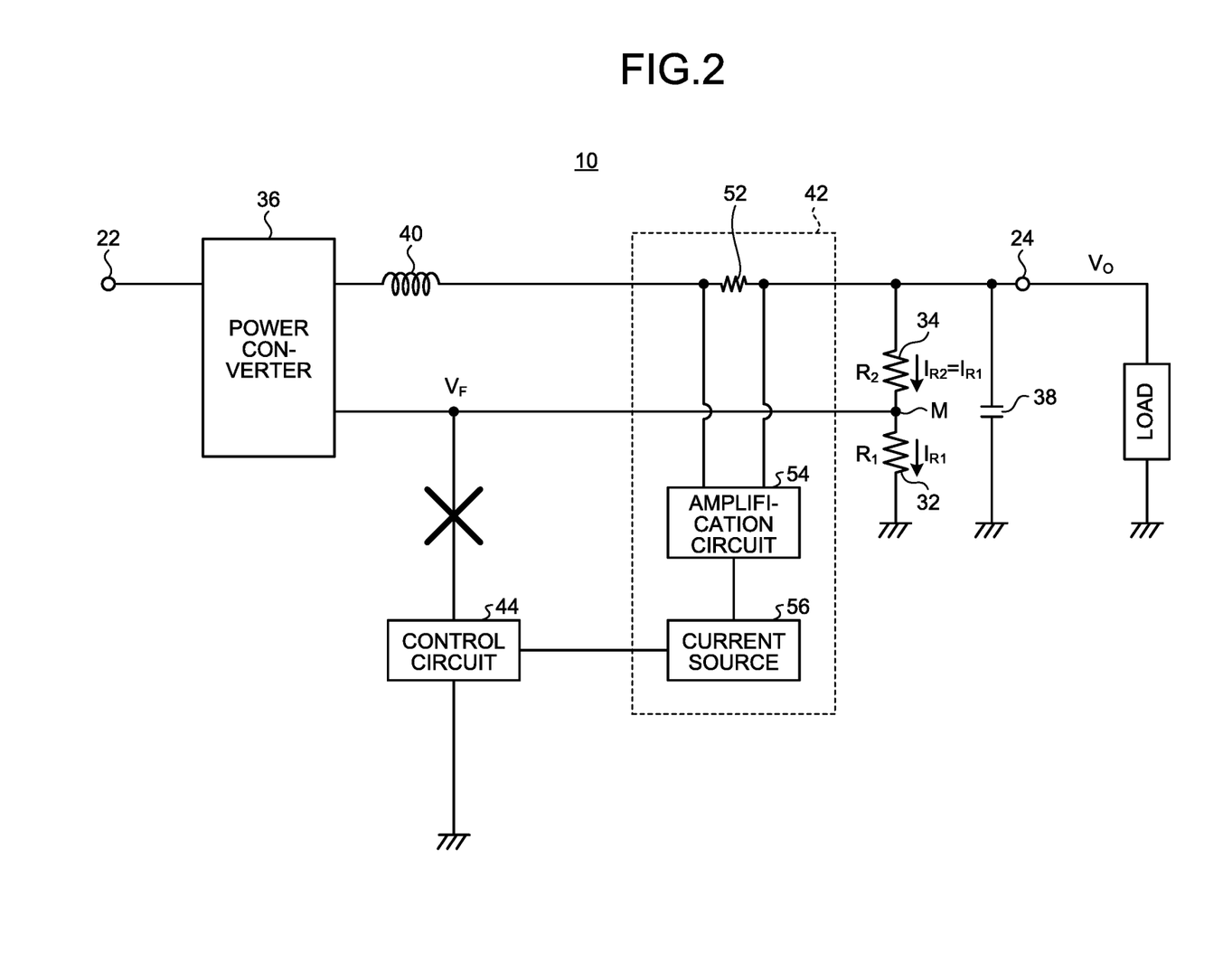
FIG. 2 is a diagram illustrating a voltage and a current of each component of the power supply device in a case in which a control circuit does not draw in a current.

FIG. 2 is a diagram illustrating a voltage and a current of each component of the power supply device 10 in a case in which the control circuit 44 does not draw in a current. As a premise of description about the operation of the power supply device 10, the following describes the operation of the power supply device 10 in a case in which the drawn-in current $I_C$ is 0, that is, in a case in which the control circuit 44 does not draw in a current from the reference point M with reference to FIG. 2.

In a case in which the control circuit 44 does not draw in a current from the reference point M, a current flowing in the first resistor 32 is the same as a current flowing in the second resistor 34. That is, in a case in which the current flowing in the first resistor 32 is assumed to be $I_{R1}$, and a current flowing in the second resistor 34 is assumed to be $I_{R2}$, $I_{R1}=I_{R2}$ is established.

Thus, in a case in which a voltage value of the output voltage $V_O$ is assumed to be $V_O$, a voltage value of the feedback voltage $V_F$ is assumed to be $V_F$, a resistance value of the first resistor 32 is assumed to be $R_1$, and a resistance value of the second resistor 34 is assumed to be $R_2$, the output voltage $V_O$ is represented by the expression (1).

$$V_O = \{(R_1+R_2)/R_1\} \times V_F \quad (1)$$

In this way, in a case in which the control circuit 44 does not draw in a current, the power supply device 10 outputs the predetermined fixed output voltage $V_O$.

Figure 3:
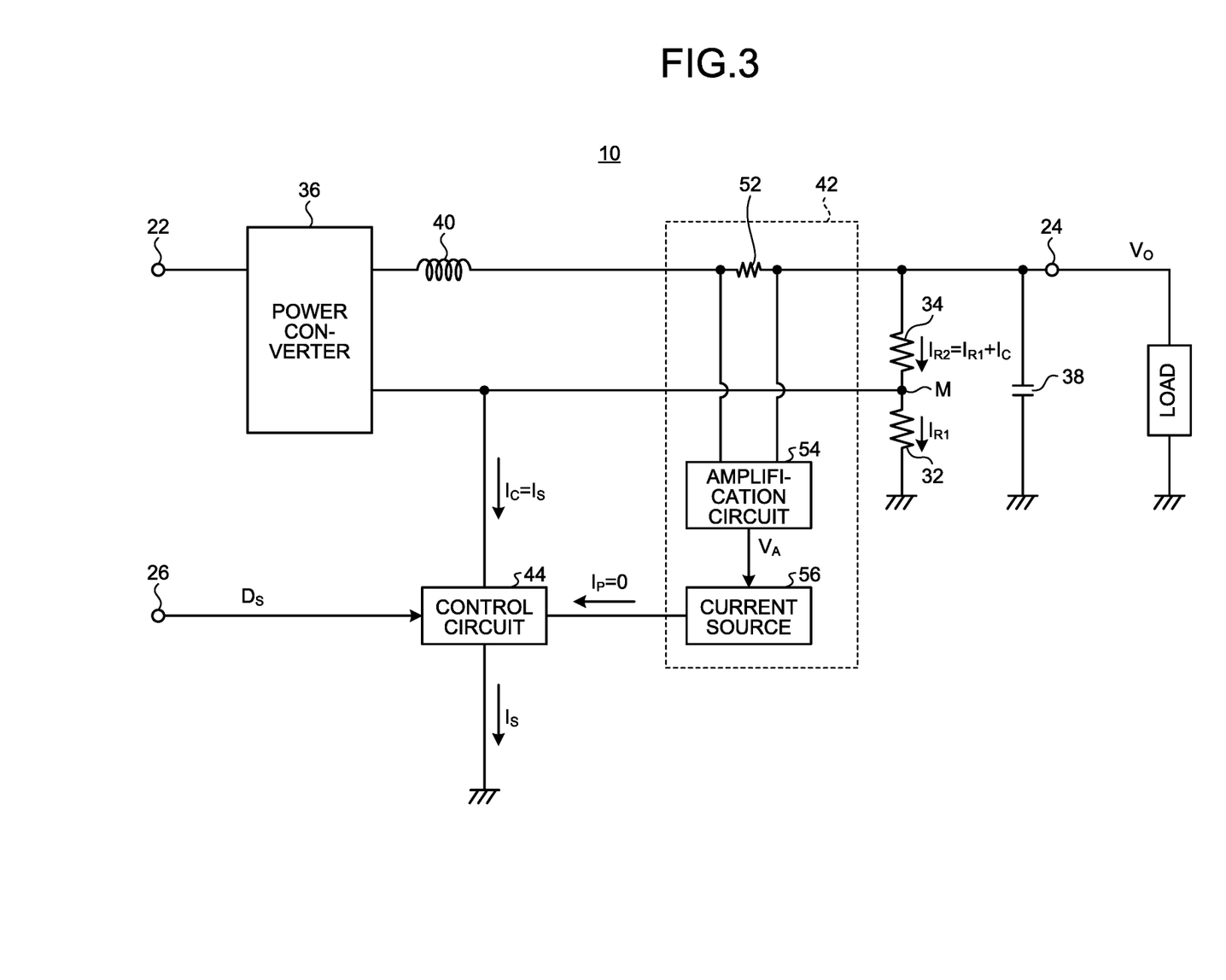
FIG. 3 is a diagram illustrating a voltage and a current of each component of the power supply device in a case in which an overcurrent is not generated.

FIG. 3 is a diagram illustrating a voltage and a current of each component of the power supply device 10 in a case in which an overcurrent is not generated. In a case in which the overcurrent does not flow in the load, that is, in a case in which the output current $I_O$ is equal to or smaller than the limit current $I_{LIM}$, the power supply device 10 operates as follows.

In a case in which the overcurrent is not generated, the overcurrent detection circuit 42 does not generate the protective current $I_P$. That is, the protective current $I_P=0$ is established.

In a case in which the protective current $I_P$ is 0, the drawn-in current $I_C$ drawn in from the reference point M is the same as the set current $I_S$ depending on the set value $D_S$ input by the user. That is, a relation between the set current $I_S$ and the drawn-in current $I_C$ is represented by the expression (3).

$$I_C = I_S \quad (3)$$

The power converter 36 controls the output voltage $V_O$ so as to cause the feedback voltage $V_F$ generated at the reference point M to have a predetermined value. That is, the power converter 36 controls the output voltage $V_O$ so as to cause the current flowing in the first resistor 32 to have a predetermined value. Due to this, in a case in which the overcurrent does not flowing in the load, the current flowing in the first resistor 32 is constant irrespective of the drawn-in current $I_C$ drawn in from the reference point M by the control circuit 44.

Thus, the current flowing in the second resistor 34 has a value obtained by adding the current flowing in the first resistor 32 to the drawn-in current $I_C$ drawn in from the reference point M by the control circuit 44. That is, in a case in which the current flowing in the first resistor 32 is assumed to be $I_{R1}$, and the current flowing in the second resistor 34 is assumed to be $I_{R2}$, a relation represented by the expression (4) is established.

$$I_{R2} = I_{R1} + I_C \quad (4)$$

By substituting the expression (3) for the expression (4), the expression (5) is obtained.

$$I_{R2} = I_{R1} + I_S \quad (5)$$

The output voltage $V_O$ is represented by the expression (6).

$$V_O = (R_1 \times I_{R1}) + \{R_2 \times (I_{R1} + I_S)\} \quad (6)$$
$$= \{(R_1 + R_2) \times I_{R1}\} + (R_2 \times I_S)$$

The power converter 36 controls $I_{R1}$ to have a predetermined value, so that $\{(R_1+R_2) \times I_{R1}\}$ in the first term of the expression (6) is a fixed value. Thus, the output voltage $V_O$ varies according to the set current $I_S$.

The set current $I_S$ is a current having a value depending on the set value $D_S$ that is previously input by the user. Thus, in a case in which the overcurrent is not flowing in the load, the power converter 36 can output the output voltage $V_O$ depending on the set value $D_S$ that is previously input by the user.

Figure 4:
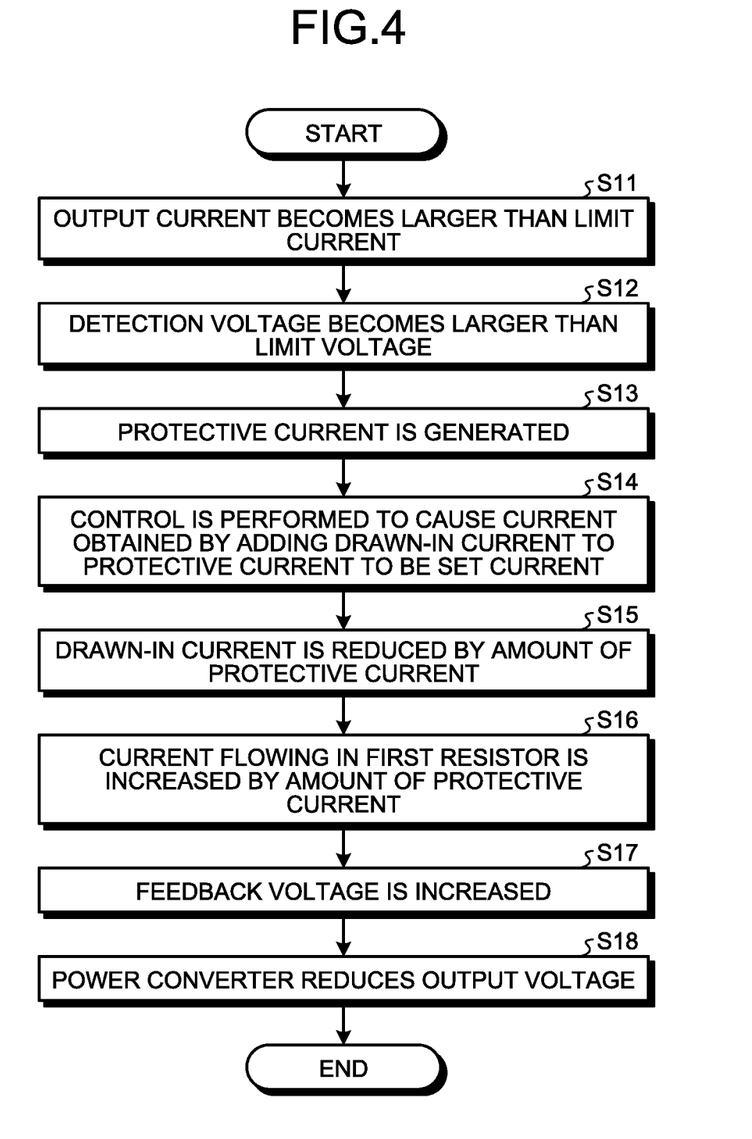
FIG. 4 is a diagram for explaining a phenomenon that occurs in the power supply device in a case in which an overcurrent is generated.

FIG. 4 is a diagram for explaining a phenomenon that occurs in the power supply device 10 in a case in which the overcurrent is generated. In a case in which the overcurrent flows into the load, as illustrated in FIG. 4, the current or the voltage of each component of the power supply device 10 is changed.

First, in a case in which the overcurrent flows into the load, the output current $I_O$ becomes larger than the limit current $I_{LIM}$ as a threshold (S11). Subsequently, in a case in which the output current $I_O$ becomes larger than the limit current $I_{LIM}$, the detection voltage $V_A$ output from the amplification circuit 54 becomes larger than the predetermined limit voltage $V_{LIM}$ (S12).

Subsequently, in a case in which the detection voltage $V_A$ becomes larger than the limit voltage $V_{LIM}$, the current source 56 generates the protective current $I_S$ (S13). The protective current $I_P$ has a value proportional to a difference voltage obtained by subtracting the limit voltage $V_{LIM}$ from the detection voltage $V_A$. Thus, as a difference voltage between the output current $I_O$ and the limit current $I_{LIM}$ is larger, the larger protective current $I_P$ flows.

Subsequently, in a case in which the current source 56 generates the protective current $I_S$, the control circuit 44 performs control so as to cause the current obtained by adding the drawn-in current $I_C$ to the protective current $I_S$ to be the set current $I_S$ depending on the set value $D_S$ input in advance (S14). In a case in which control is performed so that the current obtained by adding the drawn-in current $I_C$ to the protective current $I_P$ becomes the set current $I_S$, the drawn-in current $I_C$ drawn in from the reference point M is reduced by an amount of the protective current $I_P$ (S15).

In a case in which the drawn-in current $I_C$ is reduced by an amount of the protective current $I_S$, the current flowing in the first resistor 32 is increased by an amount of the protective current $I_P$ (S16). In a case in which the current flowing in the first resistor 32 is increased by an amount of the protective current $I_S$, a voltage (feedback voltage $V_F$) generated at the reference point M is increased (S17). In a case in which the feedback voltage $V_F$ is increased, the power converter 36 reduces the output voltage $V_O$ (S18).

In this way, in a case in which the overcurrent flows into the load, the power supply device 10 can operate to reduce the output voltage $V_O$. As a result, the power supply device 10 can reduce the overcurrent.

Figure 5:
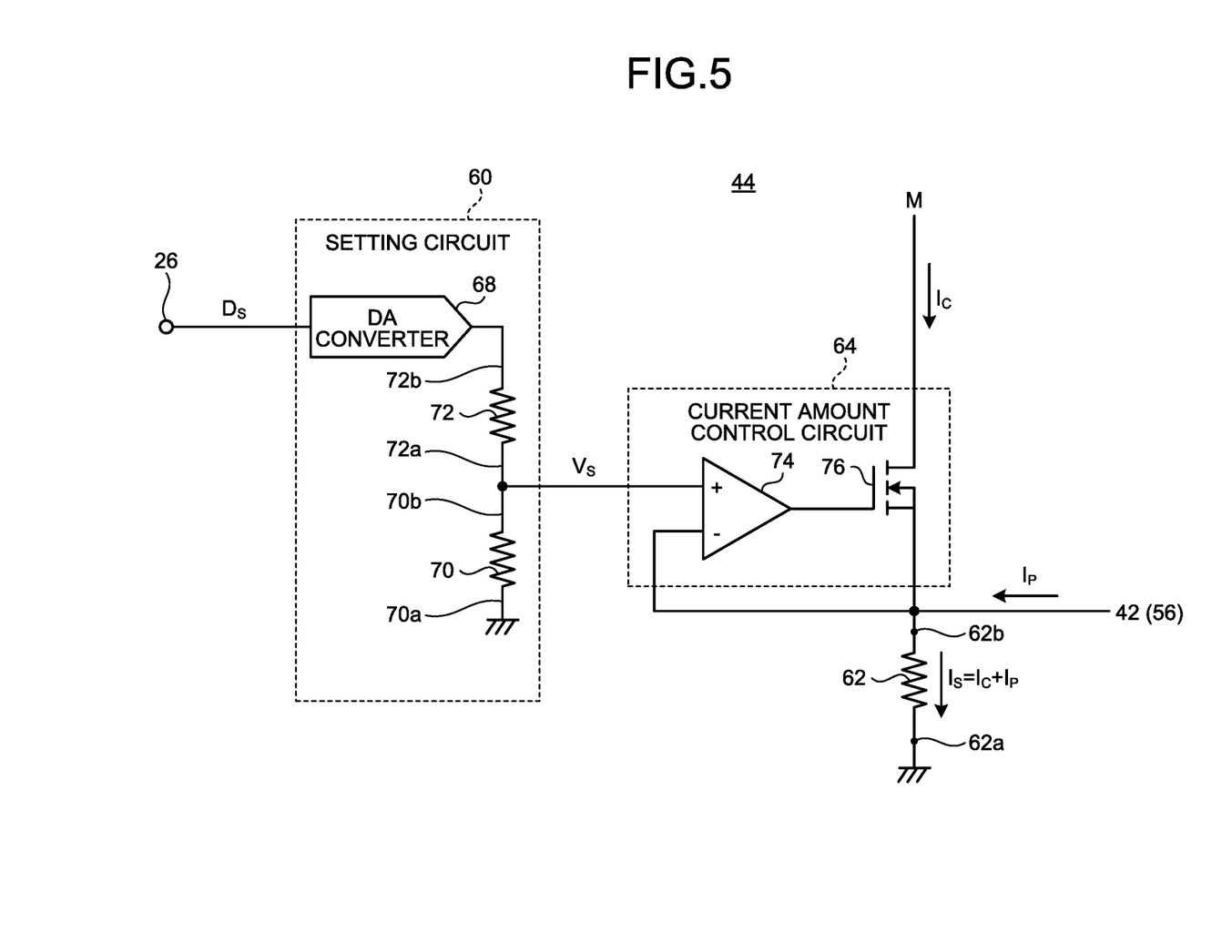
FIG. 5 is a diagram illustrating an example of a configuration of the control circuit.

FIG. 5 is a diagram illustrating an example of a configuration of the control circuit 44. For example, the control circuit 44 includes a setting circuit 60 connected to the setting terminal 26, a current amount control circuit 64 connected to the reference point M, and a drawing resistor 62 connected to the current amount control circuit 64.

The setting circuit 60 receives the set value $D_S$ via the setting terminal 26. The setting circuit 60 generates a set voltage $V_S$ depending on the received set value $D_S$.

For example, the setting circuit 60 includes a DA converter 68, a first voltage dividing resistor 70, and a second voltage dividing resistor 72. The DA converter 68 is connected to the setting terminal 26. The DA converter 68 includes an output terminal, and outputs a voltage obtained by digital/analog converting the set value $D_S$ from the output terminal.

The first voltage dividing resistor 70 and the second voltage dividing resistor 72 are connected in series between the output terminal of the DA converter 68 and the reference potential. The first voltage dividing resistor 70 includes a first terminal 70a and a second terminal 70b, and the first terminal 70a is connected to the reference potential. The second voltage dividing resistor 72 includes a first terminal 72a and a second terminal 72b, the first terminal 72a is connected to the second terminal 70b of the first voltage dividing resistor 70, and the second terminal 72b is connected to the output terminal of the DA converter 68. The first voltage dividing resistor 70 and the second voltage dividing resistor 72 can divide the voltage output from the DA converter 68 at a predetermined ratio. A connection point between the first voltage dividing resistor 70 and the second voltage dividing resistor 72 is connected to the current amount control circuit 64. Due to this, the setting circuit 60 can supply the voltage generated at the connection point to the current amount control circuit 64 as the set voltage $V_S$.

The drawing resistor 62 has a predetermined resistance value. In the drawing resistor 62, a first terminal 62a is connected to the reference potential, and a second terminal 62b is connected to the overcurrent detection circuit 42 and the current amount control circuit 64.

The current amount control circuit 64 draws in the drawn-in current $I_C$ from the reference point M. The current amount control circuit 64 supplies the drawn-in current $I_C$ drawn in from the reference point M to the second terminal 62b of the drawing resistor 62. The current amount control circuit 64 controls the drawn-in current $I_C$ drawn in from the reference point M so that the set voltage $V_S$ depending on the set value $D_S$ is generated in the second terminal 62b of the drawing resistor 62.

For example, the current amount control circuit 64 includes a first operational amplifier 74 and a field effect transistor 76. In the first operational amplifier 74, the set voltage $V_S$ is supplied to a noninverting input terminal, and an inverting input terminal is connected to the second terminal 62b of the drawing resistor 62.

The field effect transistor 76 is, for example, an N-type Metal Oxide Semiconductor Field effect transistor (MOSFET). In the field effect transistor 76, a gate is connected to the output terminal of the first operational amplifier 74, a drain is connected to the reference point M, and a source is connected to the second terminal 62b of the drawing resistor 62.

Additionally, the second terminal 62b of the drawing resistor 62 is connected to the current source 56 included in the overcurrent detection circuit 42. That is, the current source 56 of the overcurrent detection circuit 42 supplies the protective current $I_P$ to the second terminal 62b of the drawing resistor 62. Thus, the protective current $I_P$ flows into the drawing resistor 62 in addition to the drawn-in current $I_C$. Due to this, the drawing resistor 62 causes a voltage obtained by multiplying the current obtained by adding the drawn-in current $I_C$ to the protective current $I_P$ by the resistance value of the drawing resistor 62 to be generated in the second terminal 62b.

In the current amount control circuit 64, the current flowing between the drain and the source of the field effect transistor 76 is controlled so that the source of the field effect transistor 76 and the noninverting input terminal of the first operational amplifier 74 have the same electric potential. Thus, the current amount control circuit 64 can cause a voltage equal to the set voltage $V_S$ to be generated in the drawing resistor 62.

In a case in which a voltage equal to the set voltage $V_S$ is generated in the drawing resistor 62, the set current $I_S$ depending on the set value $D_S$ flows into the drawing resistor 62. In this case, a current flowing from the noninverting input terminal of the first operational amplifier 74 to the drawing resistor 62 is 0. The set current $I_S$ is a current obtained by adding the drawn-in current $I_C$ to the protective current $I_S$. The drawn-in current $I_C$ flows between the drain and the source of the field effect transistor 76. Thus, the field effect transistor 76 can adjust the drawn-in current $I_C$ flowing between the drain and the source to have a current value obtained by subtracting the protective current $I_P$ from the set current $I_S$.

As described above, the control circuit 44 can control the drawn-in current $I_C$ to have a current value obtained by subtracting the protective current $I_P$ from the set current $I_S$ depending on the set value $D_S$. The setting circuit 60 may have a configuration not including the DA converter 68. In this case, the second terminal 72b of the second voltage dividing resistor 72 is connected to the setting terminal 26. An analog voltage value is supplied as the set value $D_S$ to the setting circuit 60 having such a configuration not including the DA converter 68 via the setting terminal 26 from the outside.

Figure 6:
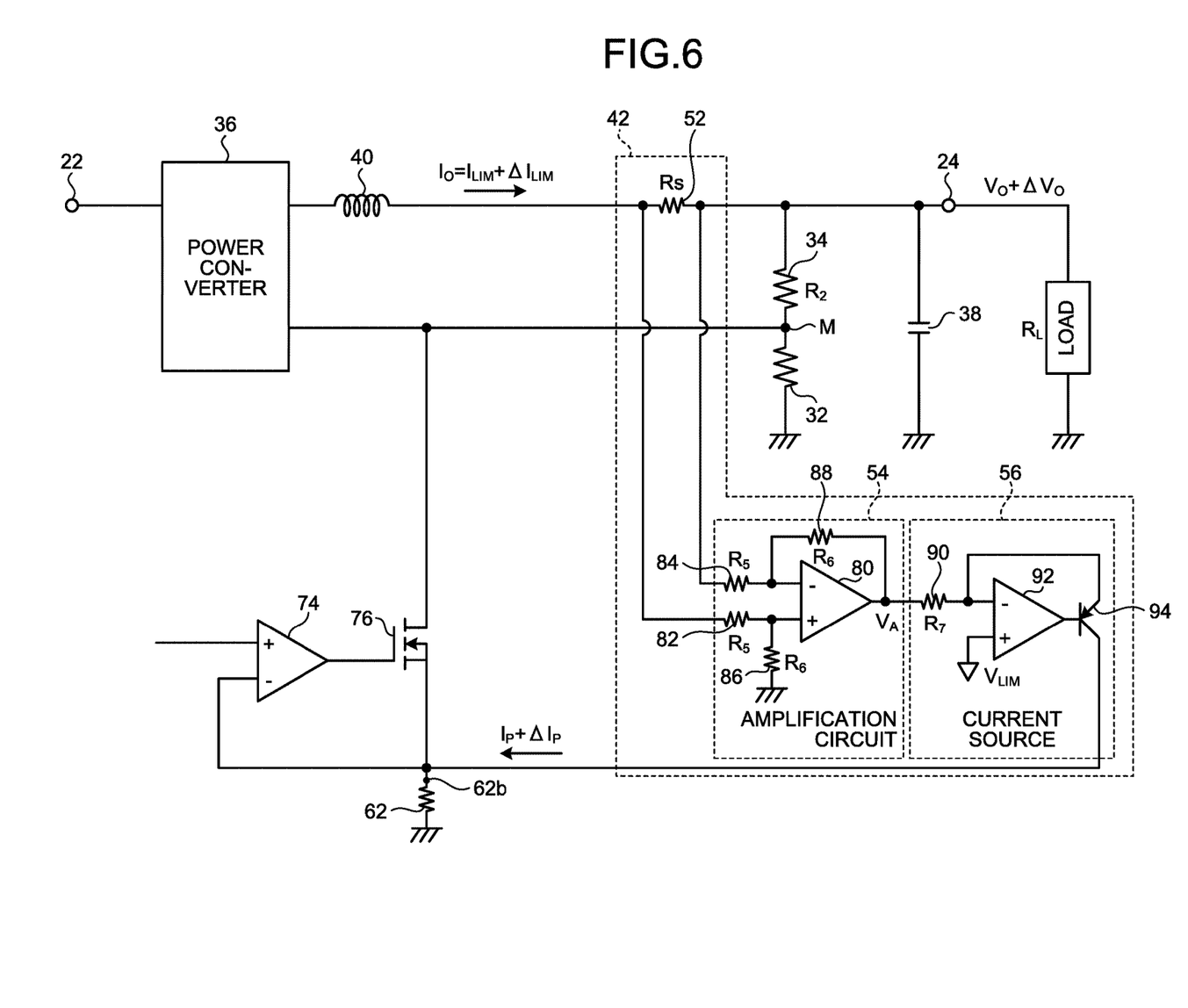
FIG. 6 is a diagram illustrating configurations of an amplification circuit and a current source, and a voltage and a current of each component of the power supply device in a case in which an overcurrent is generated.

FIG. 6 is a diagram illustrating configurations of the amplification circuit 54 and the current source 56, and the voltage and the current of each component of the power supply device 10 in a case in which the overcurrent is generated.

For example, the amplification circuit 54 includes a second operational amplifier 80, a third resistor 82, a fourth resistor 84, a fifth resistor 86, and a sixth resistor 88.

One end of the third resistor 82 is connected to a terminal of the detection resistor 52 on the power converter 36 side, and the other end thereof is connected to a noninverting input terminal of the second operational amplifier 80. One end of the fourth resistor 84 is connected to a terminal of the detection resistor 52 on the voltage output terminal 24 side, and the other end thereof is connected to an inverting input terminal of the second operational amplifier 80.

One end of the fifth resistor 86 is connected to the noninverting input terminal of the second operational amplifier 80, and the other end thereof is connected to the reference potential. One end of the sixth resistor 88 is connected to the inverting input terminal of the second operational amplifier 80, and the other end thereof is connected to an output terminal of the second operational amplifier 80.

The second operational amplifier 80 generates the detection voltage $V_A$ obtained by amplifying the predetermined voltage generated in the detection resistor 52 by an amplification factor. The amplification factor of the second operational amplifier 80 is determined based on a resistance value of each of the third resistor 82, the fourth resistor 84, the fifth resistor 86, and the sixth resistor 88. The amplification circuit 54 supplies the detection voltage $V_A$ to the current source 56.

For example, the current source 56 includes a seventh resistor 90, a third operational amplifier 92, and a bipolar transistor 94. One end of the seventh resistor 90 is connected to the output terminal of the second operational amplifier 80 included in the amplification circuit 54, and the other end thereof is connected to an inverting input terminal of the third operational amplifier 92.

The inverting input terminal of the third operational amplifier 92 is connected to an emitter of the bipolar transistor 94. The limit voltage $V_{LIM}$ is applied to the noninverting input terminal of the third operational amplifier 92. The limit voltage $V_{LIM}$ is set to have a value depending on the limit current $I_{LIM}$. The limit voltage $V_{LIM}$ is predetermined by a designer and the like.

The bipolar transistor 94 is, for example, a pnp-type. A base of the bipolar transistor 94 is connected to the output terminal of the third operational amplifier 92, and an emitter thereof is connected to the inverting input terminal of the third operational amplifier 92. A collector of the bipolar transistor 94 is connected to the second terminal 62b of the drawing resistor 62 included in the control circuit 44. The current source 56 outputs a collector current of the bipolar transistor 94 as the protective current $I_P$.

The current source 56 having such a configuration does not output the protective current $I_P$ in a case in which the detection voltage $V_A$ output from the amplification circuit 54 is equal to or smaller than the limit voltage $V_{LIM}$. However, in a case in which the detection voltage $V_A$ output from the amplification circuit 54 becomes larger than the limit voltage $V_{LIM}$, the current source 56 outputs the protective current $I_P$ depending on the difference voltage obtained by subtracting the limit voltage $V_{LIM}$ from the detection voltage $V_A$. Specifically, in a case in which the detection voltage $V_A$ supplied from the amplification circuit 54 becomes larger than the limit voltage $V_{LIM}$, the current source 56 outputs the protective current $I_P$ obtained by dividing the difference voltage, which is obtained by subtracting the limit voltage $V_{LIM}$ from the detection voltage $V_A$, by a resistance value of the seventh resistor 90.

The protective current $I_P$ output from the current source 56 is supplied to the drawing resistor 62 included in the control circuit 44. Thus, in a case in which the detection voltage $V_A$ becomes larger than the limit voltage $V_{LIM}$, a current obtained by adding the drawn-in current $I_C$ drawn in from the reference point M to the protective current $I_P$ output from the current source 56 flows into the drawing resistor 62.

In this case, a resistance value of the detection resistor 52 is assumed to be $R_S$, a current value of the output current $I_O$ is assumed to be $I_O$, resistance values of the third resistor 82 and the fourth resistor 84 are assumed to be $R_5$, resistance values of the fifth resistor 86 and the sixth resistor 88 are assumed to be $R_6$, and a voltage value of the detection voltage $V_A$ output from the second operational amplifier 80 is assumed to be $V_A$. In this case, the detection voltage $V_A$ is represented by the expression (8).

$$V_A=(R_6/R_5)\times R_S \times I_O \quad (8)$$

A voltage value of the limit voltage $V_{LIM}$ is assumed to be $V_{LIM}$, a resistance value of the seventh resistor 90 is assumed to be $R_7$, and a current value of the protective current $I_P$ is assumed to be $I_P$. In this case, the protective current $I_P$ is represented by the expression (9) and the expression (10).

$$I_P=0 \quad (9) \; \{\text{where } V_A \leq V_{LIM}\}$$

$$I_P=(V_A-V_{LIM})/R_7 \quad (10) \; \{\text{where } V_A > V_{LIM}\}$$

A current value of the limit current $I_{LIM}$ is assumed to be $I_{LIM}$. In this case, the limit voltage $V_{LIM}$ is represented by the expression (11).

$$V_{LIM}=(R_6/R_5)\times R_S \times I_{LIM} \quad (11)$$

Thus, in a case of determining the limit current $I_{LIM}$, the designer can calculate the limit voltage $V_{LIM}$ based on the expression (11).

Part of the output current $I_O$ exceeding the limit current $I_{LIM}$, that is, the overcurrent is assumed to be $\Delta I_{LIM}$. In this case, the output current $I_O$ is represented by the expression (12).

$$I_O=I_{LIM}+\Delta I_{LIM} \quad (12)$$

By substituting the expression (12) for the expression (8), the detection voltage $V_A$ is represented by the expression (13).

$$V_A=(R_6/R_5)\times R_S \times (I_{LIM}+\Delta I_{LIM}) \quad (13)$$

Based on the expression (11) and the expression (13), $V_A-V_{LIM}$ is represented by the expression (14).

$$V_A-V_{LIM}=(R_6/R_5)\times R_S \times \Delta I_{LIM} \quad (14)$$

An increment of the protective current $I_S$ corresponding to $\Delta I_{LIM}$ is assumed to be $\Delta I_P$. In this case, $\Delta I_P$ is represented by the expression (15) based on the expression (10) and the expression (14).

$$\Delta I_P=(1/R_7)\times(R_6/R_5)\times R_S \times \Delta I_{LIM} \quad (15) \; \{\text{where } V_A > V_{LIM}\}$$

In a case in which the protective current $I_S$ is generated, the power converter 36 operates so as to lower the output voltage $V_O$. A decrement of the output voltage $V_O$ in a case in which the protective current $I_S$ is generated is assumed to be $\Delta V_O$. The decrement $\Delta V_O$ of the output voltage $V_O$ corresponds to a voltage obtained by multiplying the resistance value of the second resistor 34 by an amount of the current that is not drawn in from the reference point M due to decrease of the output voltage $V_O$. The amount of the current that is not drawn in from the reference point M is the increment of the protective current $I_S$. Thus, the decrement $\Delta V_O$ of the output voltage $V_O$ is represented by the expression (16).

$$\Delta V_O = R_2 \times \Delta I_P \quad (16)$$

By substituting the expression (15) for the expression (16), the decrement $\Delta V_O$ of the output voltage $V_O$ is represented by the expression (17).

$$\Delta V_O = R_2 \times (1/R_7) \times (R_6/R_5) \times R_S \times \Delta I_{LIM} \quad (17) \; \{\text{where } V_A > V_{LIM}\}$$

On the other hand, the output current $I_O$ is represented by the expression (18).

$$I_O = V_O/R_L \quad (18)$$

In a case in which resistance in the load is assumed to be constant, the overcurrent $\Delta I_{LIM}$ is represented by the expression (19).

$$\Delta I_{LIM} = \Delta V_O/R_L \quad (19)$$

By deforming the expression (19), the decrement $\Delta V_O$ of the output voltage $V_O$ is represented by the expression (20).

$$\Delta V_O = \Delta I_{LIM} \times R_L \quad (20)$$

In this case, when the expression (17) is equal to the expression (20), or when the expression (17) is larger than the expression (20), the power supply device 10 can operate so as to lower the output current $I_O$. That is, in a case in which a relation represented by the expression (21) is established, the power supply device 10 can lower the output voltage $V_O$.

expression (17)≤expression (20)

$$R_7 \leq (R_2 \times R_6 \times R_S)/(R_5 \times R_L) \quad (21)$$

Thus, in a case of implementing a circuit configuration as illustrated in FIG. 6, the designer sets respective parameters to have a relation represented by the expression (21), for example.

As described above, the power supply device 10 according to the present embodiment can provide protection against the overcurrent without including a microcontroller for overcurrent protection and the like. Due to this, with the power supply device 10, protection against the overcurrent can be rapidly provided with a simple configuration.

The power supply device 10 provides protection corresponding to the overcurrent by reducing the output voltage $V_O$, so that protection against the overcurrent can be provided without stopping the operation of the power converter 36. Due to this, with the power supply device 10, the output voltage $V_O$ can be continuously output without restarting the power converter 36.

The power supply device 10 provides protection corresponding to the overcurrent by reducing the output voltage $V_O$, so that protection against the overcurrent can be provided without disposing a switch circuit and the like at a preceding stage of the power converter 36. Due to this, protection against the overcurrent can be provided with a simple configuration. Electric power is not consumed by the switch circuit and the like, so that protection against the overcurrent can be provided while saving electric power.

Additionally, even in a case in which a current is instantaneously increased, the power supply device 10 can control the output voltage $V_O$ in quick response. Due to this, with the power supply device 10, a rush current and the like can be reduced, for example. Thus, with the power supply device 10, the inductor 40 is not required to support a rush current, so that an allowable current of the inductor 40 is not required to be increased. That is, with the power supply device 10, the inductor 40 can be downsized. With the power supply device 10, a switching device included in the power converter 36 is not required to support a large rush current, so that the size of the switching device included in the power converter 36 can be reduced.

The overcurrent protective device including the overcurrent detection circuit 42 and the control circuit 44 can be applied to a typical power supply unit including the power converter 36. The overcurrent protective device including the overcurrent detection circuit 42 can be applied to a typical power supply unit that can control the output voltage $V_O$ including the power converter 36 and the control circuit 44. Due to this, such an overcurrent protective device can provide an overcurrent protective function to a typical power supply unit.

Modifications

Next, the following describes a plurality of modifications of the power supply device 10 according to the present embodiment. In description of the respective modifications, detailed description of a constituent element substantially the same as the constituent element described above with reference to FIG. 1 to FIG. 6 will not be repeated except points of difference.

The setting circuit 60 may include a filter so as to prevent the power supply device 10 from performing an operation that is not intended by the user. The following describes a first modification and a second modification as examples of the setting circuit 60 including the filter.

Figure 7:
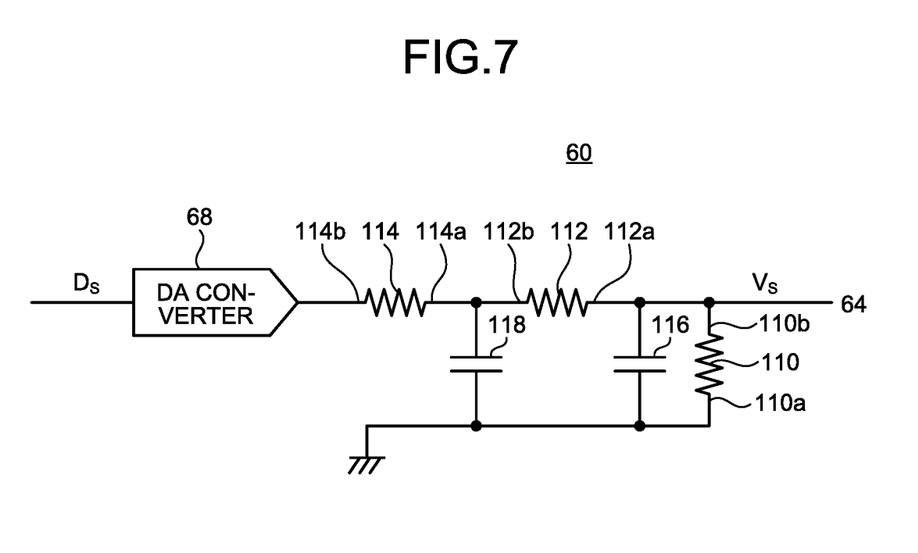
FIG. 7 is a diagram illustrating a configuration of a setting circuit according to a first modification.

FIG. 7 is a diagram illustrating a configuration of the setting circuit 60 according to the first modification. The setting circuit 60 may have a configuration as illustrated in FIG. 7. The setting circuit 60 illustrated in FIG. 7 includes a third voltage dividing resistor 110, a fourth voltage dividing resistor 112, a fifth voltage dividing resistor 114, a first capacitor 116, and a second capacitor 118 in place of the first voltage dividing resistor 70 and the second voltage dividing resistor 72.

The third voltage dividing resistor 110 includes a first terminal 110a and a second terminal 110b, and the first terminal 110a is connected to the reference potential. The fourth voltage dividing resistor 112 includes a first terminal 112a and a second terminal 112b, and the first terminal 112a is connected to the second terminal 110b of the third voltage dividing resistor 110. The fifth voltage dividing resistor 114 includes a first terminal 114a and a second terminal 114b, the first terminal 114a is connected to the second terminal 112b of the fourth voltage dividing resistor 112, and the second terminal 114b is connected to the output terminal of the DA converter 68.

The first capacitor 116 is connected between the reference potential and the second terminal 110b of the third voltage dividing resistor 110. The second capacitor 118 is connected between the reference potential and the second terminal 112b of the fourth voltage dividing resistor 112.

A connection point between the third voltage dividing resistor 110 and the fourth voltage dividing resistor 112 is connected to the current amount control circuit 64. Due to this, the setting circuit 60 can supply a voltage generated at the connection point to the current amount control circuit 64 as the set voltage $V_S$.

Additionally, the third voltage dividing resistor 110, the fourth voltage dividing resistor 112, the fifth voltage dividing resistor 114, the first capacitor 116, and the second capacitor 118 function as low-pass filters that remove high frequency components of the voltage output by the DA converter 68. Due to this, even in a case in which the voltage output from the DA converter 68 is abruptly changed due to a change of the set value $D_S$, the setting circuit 60 according to the first modification can output the stable set voltage $V_S$ that is smoothly changed. Thus, the power supply device 10 according to the first modification can output the stable output voltage $V_O$ even in a case in which the set value $D_S$ is abruptly changed.

Figure 8:
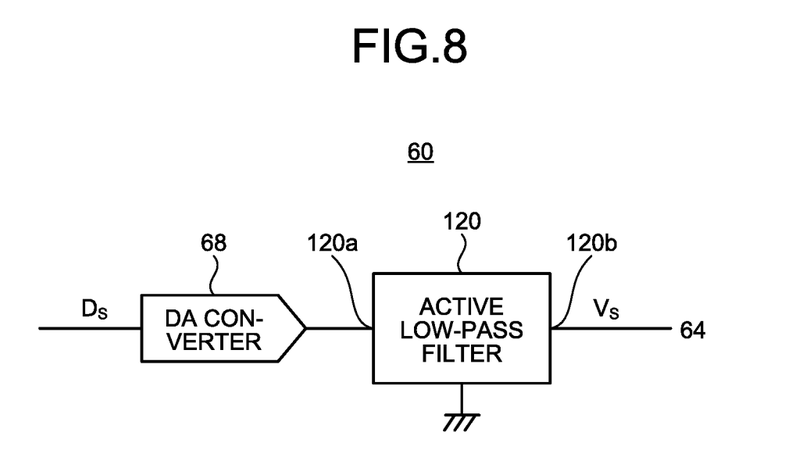
FIG. 8 is a diagram illustrating a configuration of a setting circuit according to a second modification.

FIG. 8 is a diagram illustrating a configuration of the setting circuit 60 according to the second modification. The setting circuit 60 may have a configuration as illustrated in FIG. 8. The setting circuit 60 according to the second modification illustrated in FIG. 8 includes an active low-pass filter 120 in place of the first voltage dividing resistor 70 and the second voltage dividing resistor 72.

The active low-pass filter 120 includes an input terminal 120*a* and an output terminal 120*b*, the input terminal 120*a* is connected to the output terminal 120*b* of the DA converter 68, and the output terminal 120*b* is connected to the current amount control circuit 64. Additionally, the active low-pass filter 120 is connected to the reference potential.

The active low-pass filter 120 outputs a voltage obtained by amplifying or attenuating the voltage output from the DA converter 68 by predetermined magnification. The active low-pass filter 120 can supply the output voltage to the current amount control circuit 64 as the set voltage $V_S$.

Additionally, the active low-pass filter 120 can output a voltage obtained by removing high frequency components from the voltage output by the DA converter 68. Due to this, even in a case in which the voltage output from the DA converter 68 is abruptly changed due to a change of the set value $D_S$, the setting circuit 60 according to the second modification can output the stable set voltage $V_S$ that is smoothly changed. Thus, the power supply device 10 according to the second modification can output the stable output voltage $V_O$ even in a case in which the set value $D_S$ is abruptly changed.

The filter included in the setting circuit 60 is not limited to the configuration as in the first modification and the second modification, and may be any circuit. For example, the filter may be a multi-stage (multi-order) ladder circuit constituted of a resistor and a capacitor. For example, the filter may be a circuit combining a low-pass filter and a high-pass filter. For example, the filter may be a band elimination filter circuit. The filter may be a phase filter circuit. The filter may be a circuit combining a coil and a capacitor, or a circuit including a quartz oscillator and the like. In a case in which the setting circuit 60 includes the filter, the setting circuit 60 may have a configuration not including the DA converter 68.

Figure 9:
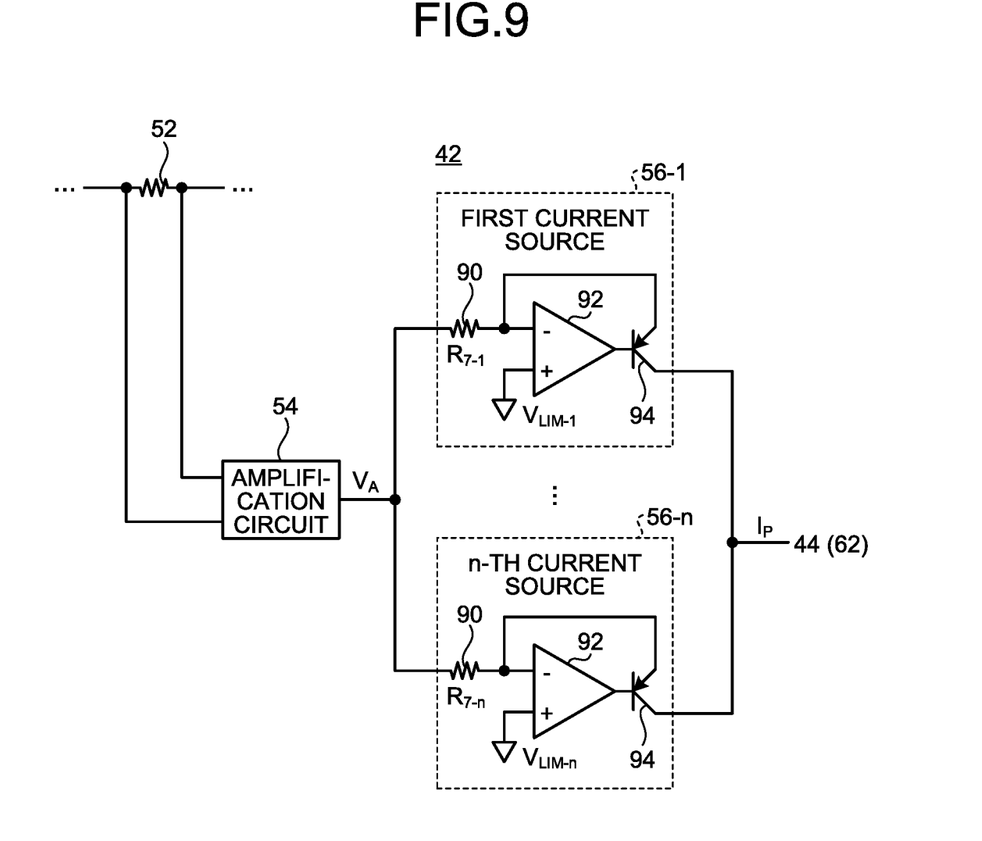
FIG. 9 is a diagram illustrating a configuration of an overcurrent protective circuit according to a third modification.

FIG. 9 is a diagram illustrating a configuration of the overcurrent detection circuit 42 according to a third modification. The overcurrent detection circuit 42 may have a configuration as illustrated in FIG. 9. The overcurrent detection circuit 42 illustrated in FIG. 9 includes the detection resistor 52, the amplification circuit 54, and first to n-th (n is an integral number equal to or larger than 2) current sources 56-1 to 56-*n*.

The amplification circuit 54 is connected to each of the first to the n-th current sources 56-1 to 55-*n*. The amplification circuit 54 supplies the detection voltage $V_A$ to each of the first to the n-th current sources 56-1 to 55-*n*.

Each of the first to the n-th current sources 56-1 to 55-*n* has the same configuration and the same function as those of the current source 56 described above with reference to FIG. 1 to FIG. 6. An output terminal of each of the first to the n-th current sources 56-1 to 55-*n* is connected to the drawing resistor 62 included in the control circuit 44. Thus, the overcurrent detection circuit 42 supplies a current obtained by adding up currents output by the first to the n-th current sources 56-1 to 55-*n* to the drawing resistor 62 included in the control circuit 44 as the protective current $I_P$.

In this case, in each of the first to the n-th current sources 56-1 to 55-*n*, at least one of a voltage value of the limit voltage $V_{LIM}$ and a resistance value of the seventh resistor 90 may be different from that of the other current source 56. For example, the overcurrent detection circuit 42 is assumed to include the first current source 56-1 and the second current source 56-2. In this case, the limit voltage $V_{LIM}$ of the first current source 56-1 is set to be higher and the resistance value of the seventh resistor 90 therein is set to be lower as compared with the second current source 56-2. That is, the limit voltage $V_{LIM}$ of the second current source 56-2 is set to be lower and the resistance value of the seventh resistor 90 is set to be higher as compared with the first current source 56-1. In the overcurrent detection circuit 42, the second current source 56-2 can operate to execute overcurrent protection in slow response in a case in which the overcurrent is small, and the first current source 56-1 can operate to execute overcurrent protection in quick response in a case in which the overcurrent is increased.

In this way, the overcurrent detection circuit 42 includes a plurality of the current sources 56 having different voltage values of the limit voltage $V_{LIM}$ and different resistance values of the seventh resistor 90. Due to this, the overcurrent detection circuit 42 according to the third modification can execute overcurrent protection by combining response speed for overcurrent protection and a threshold current value for starting overcurrent protection.

Figure 10:
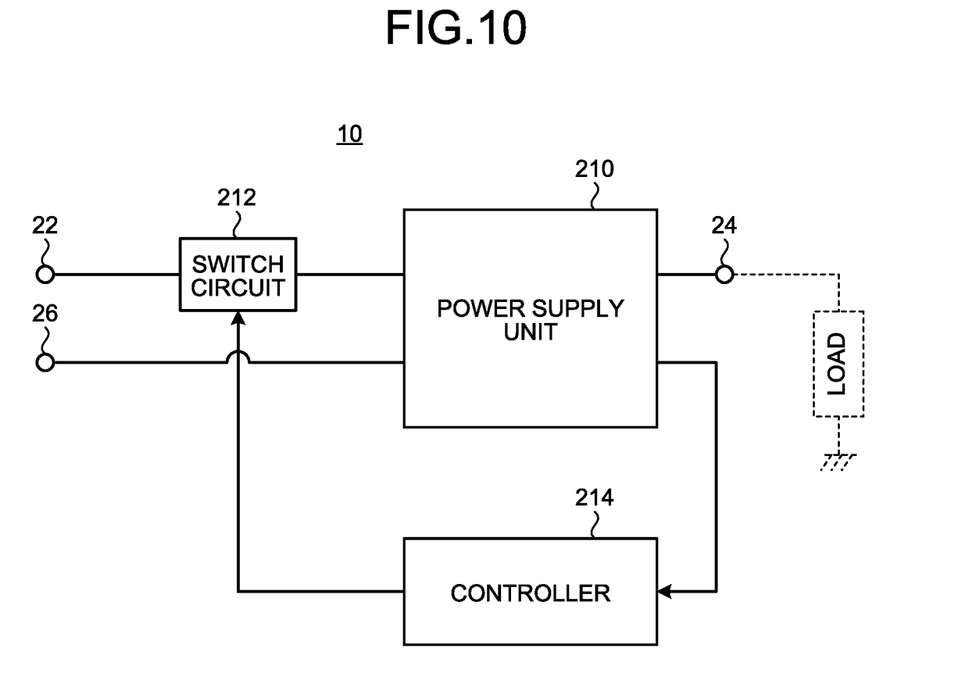
FIG. 10 is a diagram illustrating a configuration of a power supply device according to a fourth modification.

FIG. 10 is a diagram illustrating a configuration of the power supply device 10 according to a fourth modification. The power supply device 10 according to the fourth modification includes a power supply unit 210, a switch circuit 212, and a controller 214.

The power supply unit 210 has the same configuration as that of the power supply device 10 illustrated in FIG. 1. The switch circuit 212 receives electric power from the input terminal 22. The switch circuit 212 then turns on or off the electric power supplied to the power converter 36 in response to control performed by the controller 214.

The controller 214 is an information processing circuit including a processor and the like. The controller 214 acquires the detection voltage $V_A$ detected by the overcurrent detection circuit 42 included in the power supply unit 210. That is, the controller 214 acquires the detection voltage $V_A$ proportional to the output current $I_O$ flowing in the load from the power supply unit 210. The controller 214 may acquire information representing magnitude of the output current $I_O$ from a detection unit that is disposed separately from the power supply unit 210.

The controller 214 determines whether the output current $I_O$ is larger than a predetermined value based on the acquired detection voltage $V_A$. In a case in which the output current $I_O$ is larger than a predetermined value, the controller 214 turns off the switch circuit 212. Due to this, the controller 214 can stop the operation of outputting the output voltage $V_O$ performed by the power converter 36.

The power supply device 10 according to the fourth modification can provide protection against the overcurrent in a case in which a large overcurrent flows into the load that cannot be protected by the power supply unit 210, for example.

Figure 11:
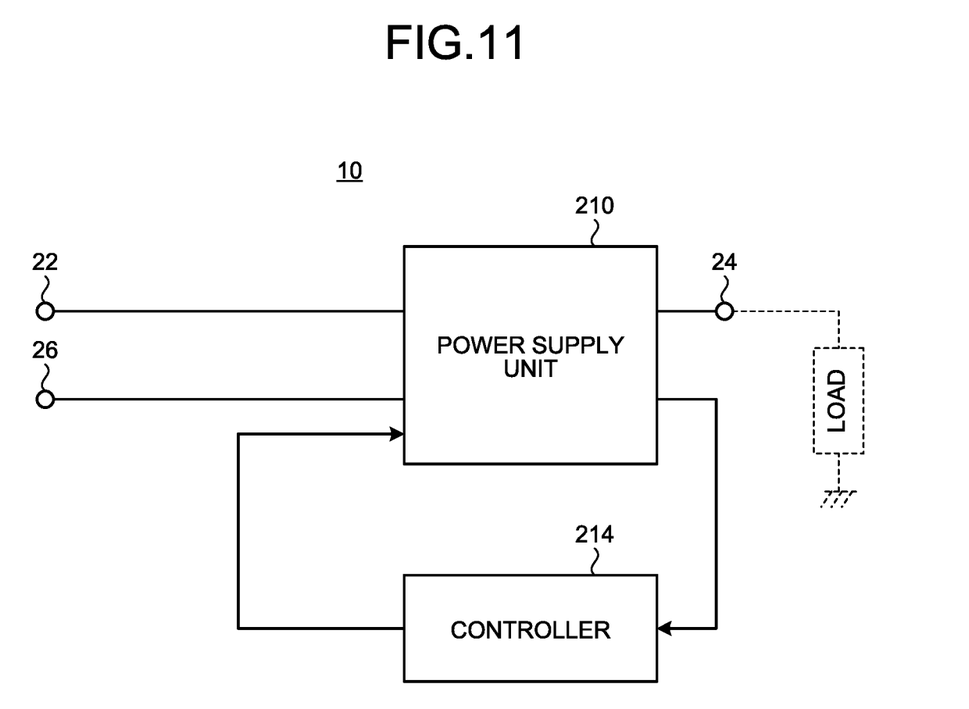
FIG. 11 is a diagram illustrating a configuration of a power supply device according to a fifth modification.

FIG. 11 is a diagram illustrating a configuration of the power supply device 10 according to a fifth modification. The power supply device 10 according to the fifth modification includes the power supply unit 210 and the controller 214.

The power supply unit 210 has the same configuration as that of the power supply device 10 illustrated in FIG. 1. The controller 214 of the fifth modification has the same configuration as that in the fourth embodiment. Similarly to the fourth modification, the controller 214 acquires the detection voltage $V_A$ detected by the overcurrent detection circuit 42 included in the power supply unit 210, and determines whether the output current $I_O$ is larger than a predetermined value based on the acquired detection voltage $V_A$.

In a case in which the output current $I_O$ is larger than the predetermined value, the controller 214 according to the fifth modification instructs the power converter 36 included in the power supply unit 210 to stop outputting the output voltage $V_O$. Due to this, the controller 214 can stop the operation of outputting the output voltage $V_O$ performed by the power converter 36. The power supply device 10 according to the fifth modification can provide protection against the overcurrent in a case in which a large overcurrent flows into the load that cannot be protected by the power supply unit 210, for example.

A power supply device and an overcurrent protective device according to the present disclosure can rapidly provide protection against an overcurrent.

While certain embodiments and modifications have been described, these embodiments and modifications have been presented by way of example only, and are not intended to limit the scope of the inventions. These embodiments may be embodied in a variety of other forms; furthermore, various omissions, substitutions and changes may be made without departing from the gist of the invention. These embodiments and modifications are encompassed by the scope and the gist of the invention, and similarly, encompassed by the invention described in CLAIMS and equivalents thereof.

What is claimed is:

1. A power supply device comprising:
   an output terminal;
   a first resistor and a second resistor connected in series between the output terminal and a reference potential;
   a power converter connected to the output terminal and a reference point between the first resistor and the second resistor, configured to supply a first voltage to the output terminal, and configured to control the first voltage to cause a second voltage generated at the reference point, to have a predetermined value;
   a protective current output circuit configured to output, without stopping an operation of the power converter, a protective current depending on an output current supplied to the output terminal and a limit current serving as a threshold; and
   a control circuit to which the protective current is input, the control circuit being configured to draw in, from the reference point, a drawn-in current obtained by subtracting the protective current from a set current depending on a set value.

2. The power supply device according to claim 1, wherein the protective current output circuit comprises:
   a detection resistor connected in series between the power converter and the output terminal;
   an amplification circuit configured to output a detection voltage obtained by amplifying a voltage generated in the detection resistor by a predetermined amplification factor; and
   a current source configured to output the protective current depending on a difference voltage obtained by subtracting a limit voltage that is a voltage depending on the limit current, from the detection voltage in a case in which the detection voltage is larger than the limit voltage, and output the protective current having a value of 0 in a case in which the detection voltage is equal to or smaller than the limit voltage.

3. The power supply device according to claim 2, wherein the control circuit comprises:
   a drawing resistor comprising a first terminal and a second terminal, the first terminal being connected to the reference potential; and
   a current amount control circuit configured to supply the drawn-in current to the second terminal of the drawing resistor, and control the drawn-in current so as to cause a set voltage depending on the set value to be generated in the drawing resistor, and
   the protective current output circuit is configured to supply the protective current to the second terminal of the drawing resistor.

4. The power supply device according to claim 3, wherein the current amount control circuit comprises:
   an operational amplifier including a noninverting input terminal to which the set voltage is supplied, and an inverting input terminal connected to the second terminal of the drawing resistor; and
   a field effect transistor including a gate connected to an output terminal of the operational amplifier, a drain connected to the reference point, and a source connected to the second terminal of the drawing resistor.

5. The power supply device according to claim 1, further comprising:
   a switch circuit configured to turn on or off electric power supplied to the power converter; and
   a controller configured to turn off the switch circuit in a case in which the output current is larger than a predetermined value.

6. The power supply device according to claim 1, further comprising:
   a controller configured to instruct the power converter to stop outputting the first voltage in a case in which the output current is larger than a predetermined value.

7. An overcurrent protective device configured to provide protection against an overcurrent in a power supply device, the power supply device comprising:
   an output terminal;
   a first resistor and a second resistor connected in series between the output terminal and a reference potential; and
   a power converter connected to the output terminal and a reference point between the first resistor and the second resistor, configured to supply a first voltage to the output terminal, and configured to control the first voltage to cause a second voltage generated at the reference point, to have a predetermined value,
   the power supply device being configured to output a direct-current output voltage to a load from the output terminal,
   the overcurrent protective device comprising:
       a protective current output circuit configured to output, without stopping an operation of the power converter, a protective current depending on an output current supplied to the output terminal and a limit current serving as a threshold; and a control circuit to which the protective current is input, the control circuit being configured to draw in, from the reference point, a drawn-in current obtained by subtracting the protective current from a set current depending on a set value.

8. The overcurrent protective device according to claim 7, wherein the protective current output circuit comprises:

a detection resistor connected in series between the power converter and the output terminal;

an amplification circuit configured to output a detection voltage obtained by amplifying a voltage generated in the detection resistor by a predetermined amplification factor; and a current source configured to output the protective current depending on a difference voltage obtained by subtracting a limit voltage that is a voltage depending on the limit current, from the detection voltage in a case in which the detection voltage is larger than the limit voltage, and output the protective current having a value of 0 in a case in which the detection voltage is equal to or smaller than the limit voltage.

9. The overcurrent protective device according to claim 8, wherein the control circuit comprises:

a drawing resistor comprising a first terminal and a second terminal, the first terminal being connected to the reference potential; and a current amount control circuit configured to supply the drawn-in current to the second terminal of the drawing resistor, and control the drawn-in current so as to cause a set voltage depending on the set value to be generated in the drawing resistor, and the protective current output circuit is configured to supply the protective current to the second terminal of the drawing resistor.

10. The overcurrent protective device according to claim 9, wherein the current amount control circuit comprises:

an operational amplifier including a noninverting input terminal to which the set voltage is supplied, and an inverting input terminal connected to the second terminal of the drawing resistor; and a field effect transistor including a gate connected to an output terminal of the operational amplifier, a drain connected to the reference point, and a source connected to the second terminal of the drawing resistor.

\* \* \* \* \*